Jan. 1, 1963 M. PARUOLO ET AL 3,071,247
SHEAR MARK DETECTOR
Filed June 22, 1959 5 Sheets-Sheet 1
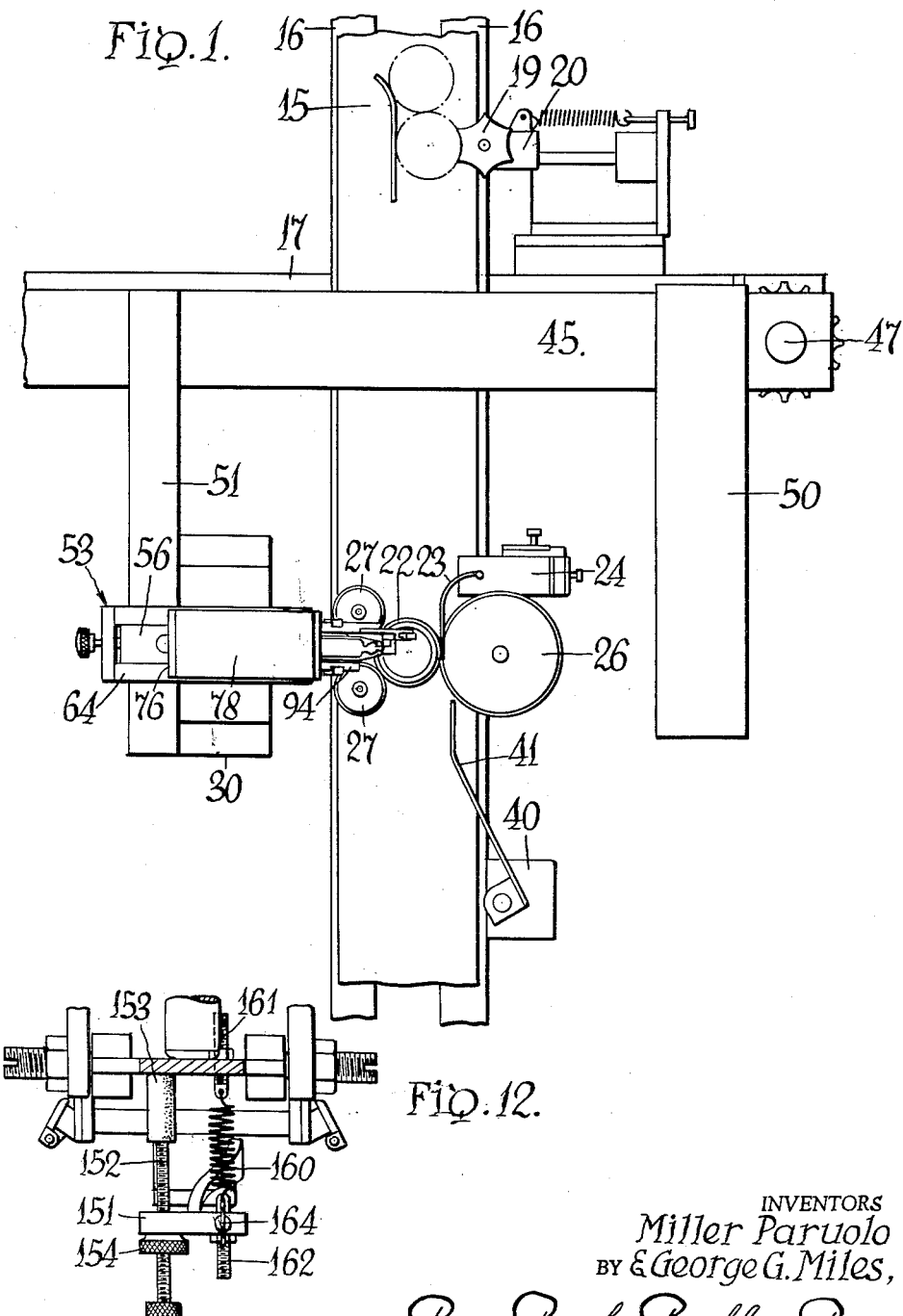
INVENTORS
Miller Paruolo
BY & George G. Miles,
Bean, Brooks, Buckley & Bean
ATTORNEYS.

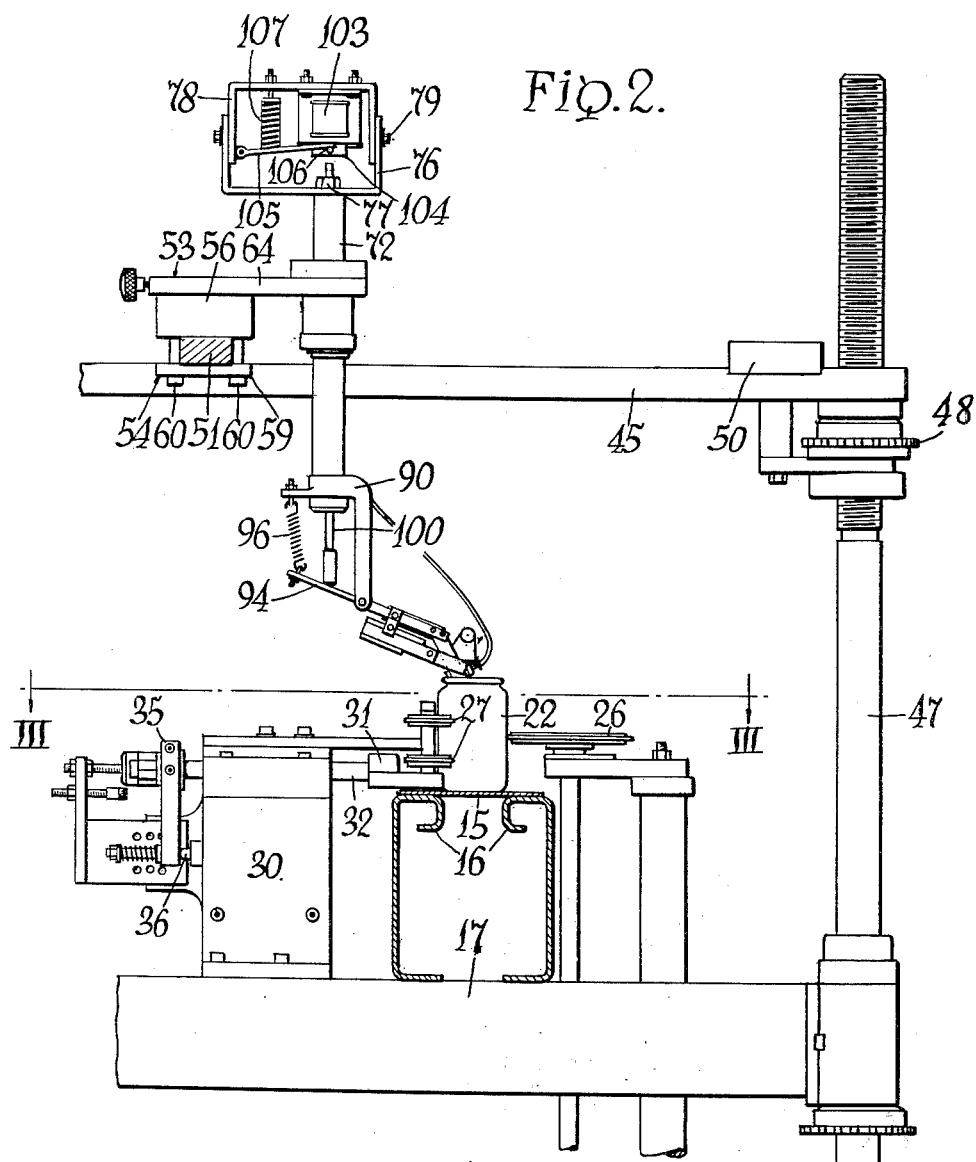
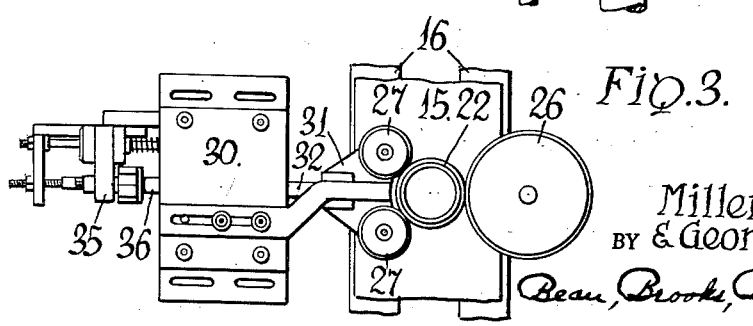

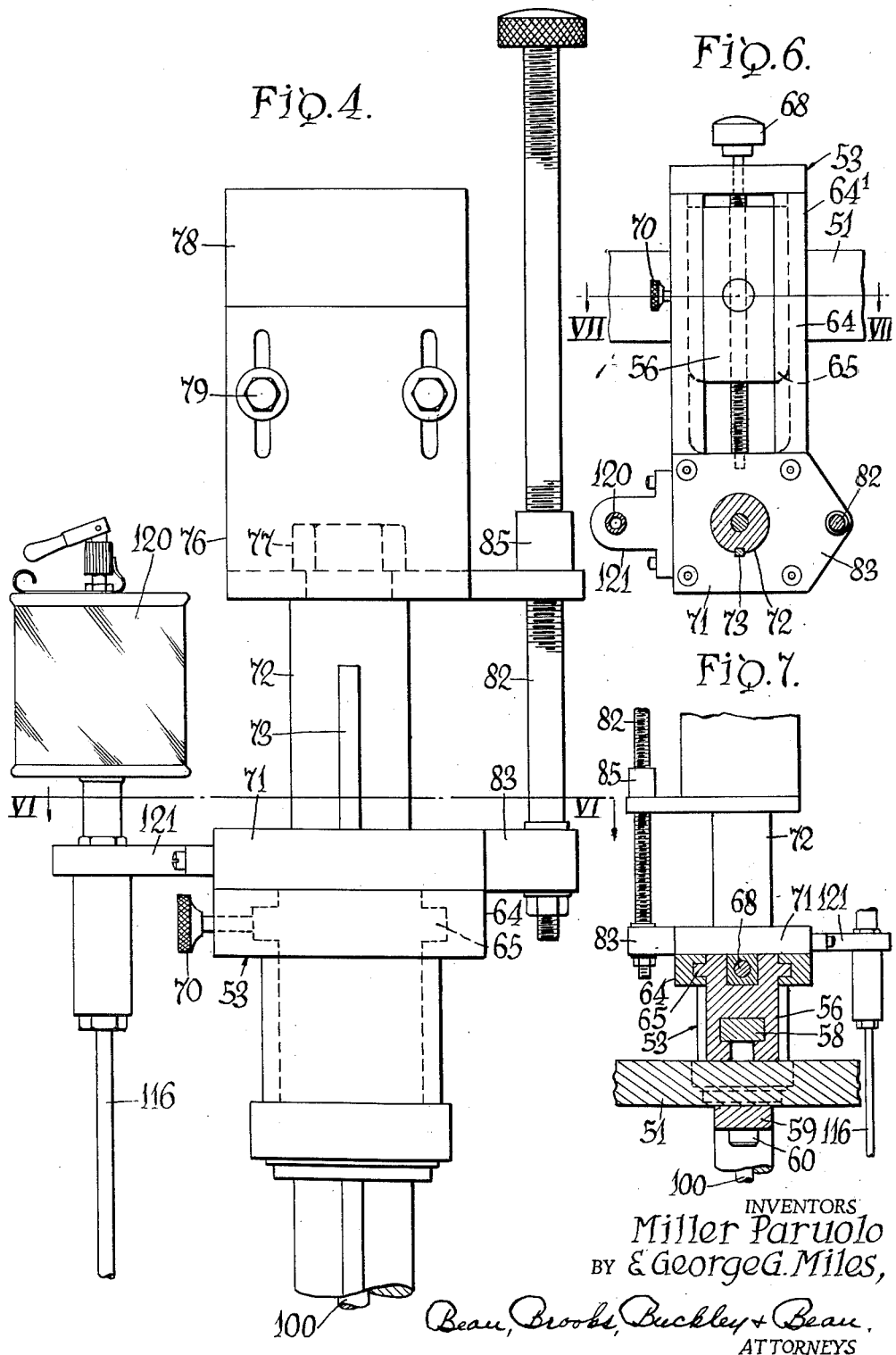

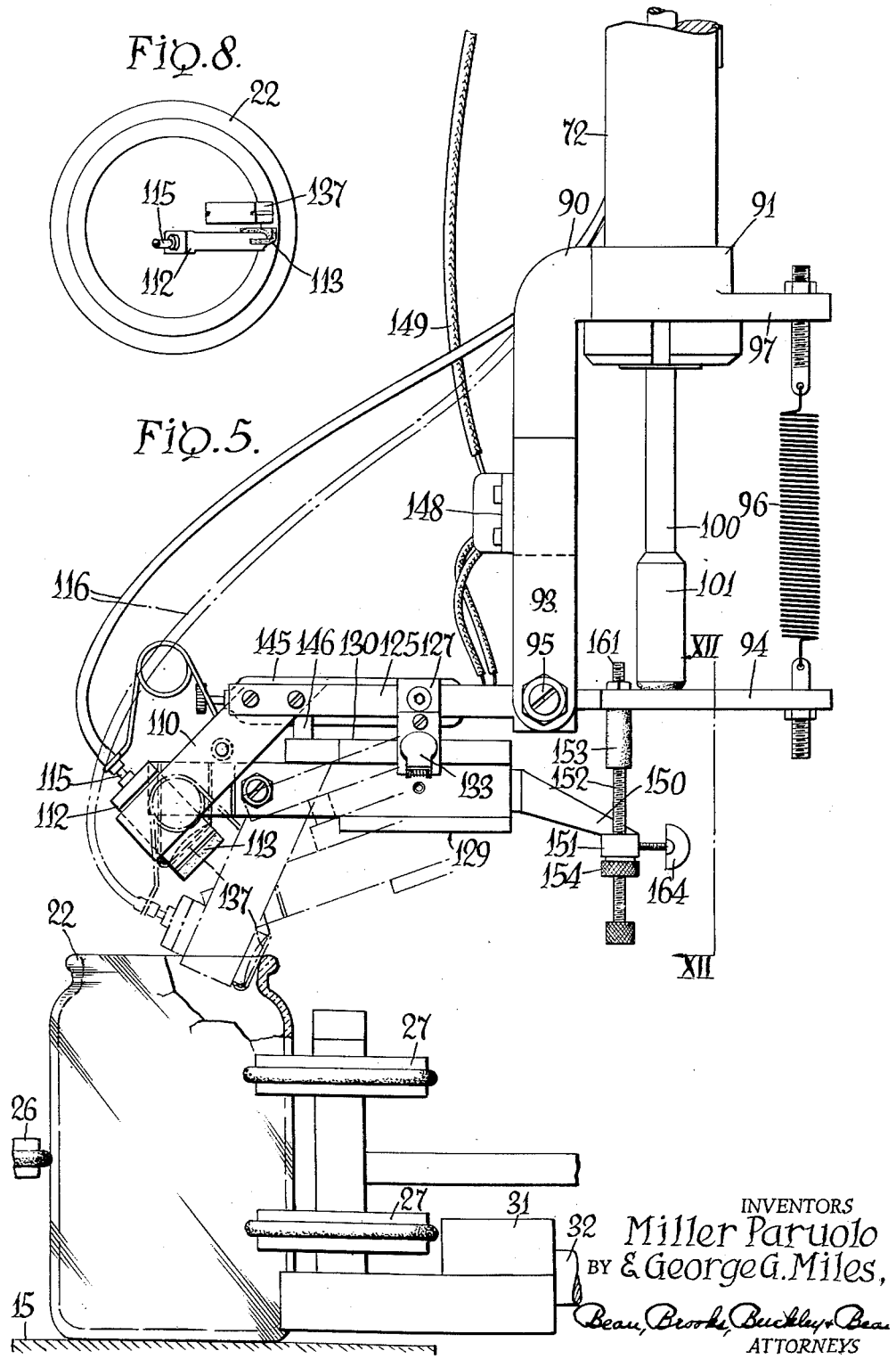

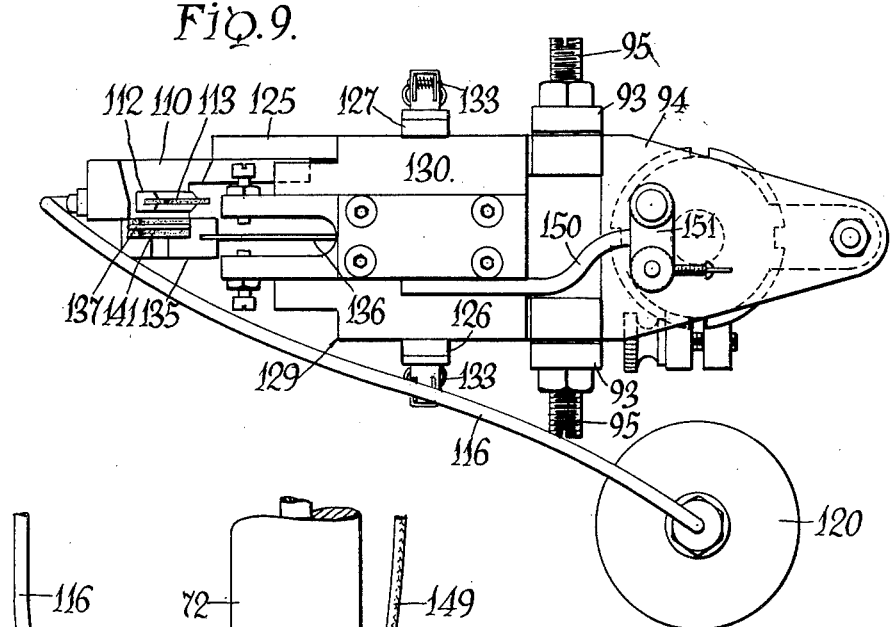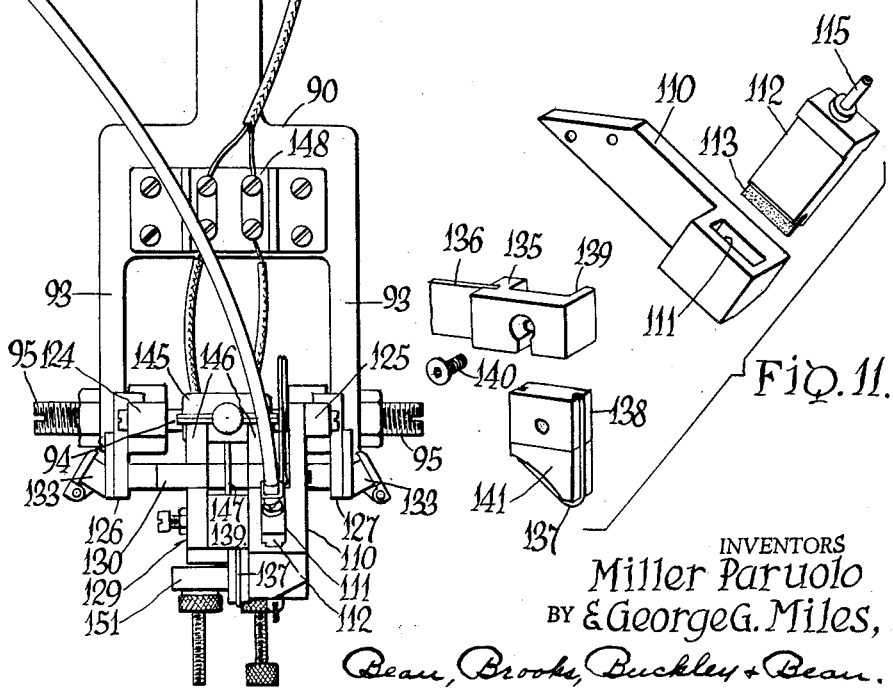

United States Patent Office 3,071,247
Patented Jan. 1, 1963

3,071,247
SHEAR MARK DETECTOR
Miller Paruolo and George G. Miles, Brockway, Pa., assignors to Brockway Glass Company, Inc., Brockway, Pa.
Filed June 22, 1959, Ser. No. 821,982
5 Claims. (Cl. 209—88)

This invention relates to automatic inspection apparatus for glassware and particularly to apparatus for use in inspecting mass produced glass containers or similar round objects.

Certain types of defects in glass containers are effectively detected by optical or photoelectric inspection means. Such optically sensible defects are mainly cracks in the glassware or defects which produce similar phenomena in the reflection or refraction of light. Certain other common defects are not readily detected in this manner, mainly defects which consist of protuberances or depressions in the glass surface. Such defects occur most commonly and in the most troublesome degree at the finish of a glass container and are sometimes due to and known as shear marks.

The present invention provides automatic inspection apparatus which provides tactile sensing means for detecting such surface defects, as distinguished from refracting and reflecting or other optical means. In the apparatus of the present invention the tactile means comprises a feeler or sensing member which engages along the glass surface and a crystal cartridge of the type employed in phonograph pick-ups for receiving deflections in the feeler or sensing member and converting the same to electrical impulses which may then be amplified and employed in controlling subsequent movements of defective articles to divert the same from the normal delivery flow of satisfactory articles.

The apparatus of the present invention provides automatic means for locating a circular glass article such as a container, for rotating the same on its axis, for introducing a feeler element into the proper position for tactile engagement with a predetermined portion of the rotating article, and for controlling subsequent movements of such article in accordance with the presence or absence of defects in the surface traversed by the tactile means. The present apparatus also provides means for lubricating the surface to be traversed by the sensing member to avoid false indications which might otherwise result from mere frictional deflection of the sensing member.

A typical embodiment of the principles of the present invention is illustrated in the accompanying drawings and described in detail in the following specification but it is to be understood that such embodiment is merely by way of illustrating the principles of the present invention and that the spirit and scope of the invention is not limited to such embodiment nor otherwise than as defined in the appended claims.

In the drawings:

FIG. 1 is a fragmentary plan view of a portion of a conveyor belt leading from glass container fabricating machinery or, more strictly speaking in the present instance, leading from an annealing lehr through which finished glass containers pass following manufacture, with one form of the automatic inspection means of the present invention illustrated generally in association with such conveyor.

FIG. 2 is a transverse cross-sectional view through the conveyor of FIG. 1 illustrating the automatic inspection means associated therewith in end elevation viewed from the delivery end of the conveyor.

FIG. 3 is a fragmentary top plan view of the means for holding and spinning a glass container at the inspection station, such view being taken approximately as indicated by the line III—III of FIG. 2.

FIG. 4 is a side elevational view of the upper portion of the automatic inspection means of FIG. 2 on an enlarged scale and viewed from the right-hand side of FIG. 2.

FIG. 5 is an elevational view of the lower portion of the inspection means of FIG. 2 on an enlarged scale but viewed from the entry end of the conveyor, rather than the delivery end as in FIG. 2.

FIG. 6 is a fragmentary horizontal cross-sectional view taken approximately on the line VI—VI of FIG. 4 but on a somewhat reduced scale.

FIG. 7 is a fragmentary cross-sectional view taken approximately on the line VII—VII of FIG. 6.

FIG. 8 is a fragmentary top plan view of the lubricating and feeling or sensing elements of FIG. 5.

FIG. 9 is a bottom plan view of the automatic inspection mechanism of FIG. 5.

FIG. 10 is a fragmentary elevational view of the detecting or sensing mechanism of FIG. 5 viewed from the left-hand side thereof.

FIG. 11 is an exploded perspective view of the lubricating and feeling or sensing components of the form of inspection apparatus illustrated herein; and FIG. 12 is a fragmentary elevational view of a portion of the structure of FIG. 5 taken as indicated by the line XII—XII of FIG. 5.

The inspection apparatus of the present invention which detects defects by tactile sensing may be employed simultaneously and in conjunction with photoelectric defect detection means which is particularly sensitive to the presence of defects which produce substantial variations in light refraction and reflection. That is, a given container oriented at a given inspection point may be rotated to cause the sensing means of the present invention to traverse a given orbit about the container, and at the same time optical scanning means may traverse the same or other orbits about the container, and both of these inspection methods and devices may act upon a single container-rejecting mechanism so that a defect sensed through either the tactile means of the present invention or the optical means which may be used in conjunction therewith will energize the same article rejection apparatus.

An automatic optical inspection means of the kind referred to here is illustrated and described in detail in a pending United States patent application of George G. Miles and John McMackin, Serial No. 535,596, filed September 21, 1955, now Patent No. 2,902,151. This application illustrates and describes in detail mechanism for orienting containers or like articles along a conveyor belt, for passing them one by one to an inspection zone, for triggering a container arresting and rotating means as a container moves into the inspection zone, and for operating a container-rejection means when a detectable light variation produces the necessary electrical impulse upon the presence of a defect.

Accordingly, the means which releases containers one by one to the inspection means, the means for triggering and timing the inspection cycle, and the rejection means, will be described herein only in a general way, it being understood that the details of the mechanisms for these purposes may be the same as in the above-mentioned copending application.

Referring particularly to FIGS. 1 and 2 of the drawings, the numeral 15 designates the upper reach or extent of a conveyor belt which is supported by a pair of longitudinal structural members 16 which are rigidly attached to a transverse supporting member designated 17 in FIG. 2 which comprises a part of the general structural supporting means of the conveyor. The transverse member 17 also supports the automatic inspection apparatus which comprises the subject matter of the present invention.

A series of glass containers is carried along on the surface of conveyor belt 15 coming from the top of the sheet as viewed in FIG. 1 and coming toward the observer as viewed in FIG. 2, and various aligning and orienting arrangements which are well known in this art may be employed. The containers are temporarily arrested in their movement along the conveyor by engagement between the projections of a star wheel designated 19 in FIG. 1 and the latter is periodically rotated an increment of one tooth by electromagnetic means, designated generally by the numeral 20, to release single containers for movement along the belt to the inspection point. The orienting and star wheel container releasing mechanism is all more fully disclosed in the pending application referred to above and per se forms no part of the present invention.

In FIGS. 1, 2, 3 and 5 a container designated 22 is shown in the ultimate position of inspection. In moving into such position by travel of the conveyor belt 15 upon which the container rests, the latter engages a swinging trigger member 23 which is thus moved in a counterclockwise direction as viewed in FIG. 1 to close a triggering switch container in a casing 24 and closing of such switch initiates a conventional time delay switch mechanism which initiates a cycle of inspection operation.

In FIGS. 1, 2, 3 and 5 the numeral 26 designates a rotatable container spinning wheel which in the present instance is provided with a rubber tire at its periphery for engaging the glass container in a cushioned manner to avoid marring the same and to rotate the same by frictional engagement.

The wheel 26 is arranged for rotation on a fixed axis and as the container 22 reaches a position of approximate tangency therewith, two pairs of freely rotatable retaining rollers or wheels 27 move to the right, as viewed in FIGS. 1, 2 and 3 to move the container 22 against the spinning wheel 26, whereby the container is rotated by the latter until the spinning wheel 26 ceases or the rollers or wheels 27 are again withdrawn. The means for moving the wheels or rollers 27 laterally toward and away from the container 22 at the inspection zone will now be described, particularly with reference to FIGS. 2 and 3.

The mechanism which clamps the glass containers against the spinning wheel 26 through the cooperation of the wheels or rollers 27 comprises a framework 30 which is mounted upon the rigid transverse structural member 17 and the wheels or rollers 27 are carried by a bracket 31 which is fixed to the end of a horizontal shaft 32, the latter being axially slidable in framework 30. In the present instance, two pairs of wheels or rollers 27 are provided, arranged as clearly shown in FIGS. 2 and 3.

Shaft 32 is normally biased to the left as viewed in FIGS. 1, 2 and 3, that is, to a non-clamping or withdrawn position, by a compression spring 34 which acts between framework 30 and an arm member 35 which is fixed to shaft 32. An electromagnet (not shown) is contained within the framework 30 and an armature thereof includes an extension 36 which, upon energization of the electromagnet, draws the arm 35 to the right as viewed in FIGS. 1 and 2 and thus moves the rollers or wheels 27 against a container 2 to clamp the latter tangentially between the freely rotatable clamping rollers 27 and the spinning wheel 26.

The drive mechanism for spinning the wheel 26 may contain a clutch and an electromagnet for controlling the same, so that energization of the clamping electromagnet within the framework 30 also energizes the spinning wheel clutch magnet so that the wheel 26 rotates only during the clamping period. The control switch within the casing 24 is a well known form of time delay switch which may be adjusted to remain closed for any predetermined period of time following initial closure by engagement of a container 22 against the triggering arm 23.

Accordingly, a container 22 will be clamped and spun for at least a full rotation and preferably at least a fraction of a rotation in addition to assure full inspection. Then the spinning of wheel 26 ceases; the clamping mechanism returns under the impetus of spring 34 to withdraw the clamping rollers or wheels 27, and the container 22 continues to be moved along on conveyor belt 15. Thereupon the time delay switch in the casing 24 opens resetting the cycle.

If no defects have been detected at the inspection station the container 22 will move along the belt 15 to a delivery point where containers are removed from the belt for packing or other final disposition. However, if a defect is present, an electrical impulse is generated in a manner which will presently be described more fully and this impulse activates an electromagnet in a reject control casing 40 which swings a rejector paddle 41 in a counterclockwise direction as viewed in FIG. 1 so that the paddle 41 intercepts the container 22 issuing from the inspection station and deflects the same off of the belt 15 into a scrap container or the like.

The switch which controls the deflecting paddle solenoid may likewise be of the time delay type so that the deflecting paddle 41 remains in deflecting position only for enough time to insure deflection of a defective article. reference will now be had to the structure for adjustably supporting the defect detecting mechanism per se, such supporting structure being adjustable to properly position the detecting mechanism in a correct general location for operating upon containers or similar articles of various sizes and shapes.

Included in such supporting structure is a transverse beam member 45 supported at its ends upon vertical screws, the right-hand one of which is shown at 47 in FIGS. 1 and 2. The screws 47 are fixed in the rigid structural member 17 and are held against rotative and axial movement. Means are provided for synchronously rotating internally threaded sprockets 48 to raise and lower the beam 45 which, it will be noted, extends over the top of belt 15.

An arm member 50 which is fixed to beam 45 projects at right angles therefrom for supporting a portion of the optical inspection means referred to briefly hereinabove and certain other portions of the optical inspection means are fixed directly to beam 45. However, since the optical inspection means forms no direct part of the present invention these devices have been omitted and need not be alluded to further.

A further arm 51 is fixed to beam 45 and projects therefrom parallel to the belt 15, as clearly shown in FIG. 1. A supporting structure for the defect detecting or sensing means of the present invention is designated generally in FIGS. 1 and 2 by the numeral 53 and is clamped to arm 51 by clamp means designated generally by the numeral 54, whereby the entire tactile sensing mechanism may be adjusted along arm 51 in a direction parallel to the extent of the conveyor belt 15 to locate the sensing mechanism properly in such direction with respect to a container 22 in inspecting position as illustrated in FIG. 1.

The support means 53 includes means for adjusting the present sensing mechanism in a horizontal direction at right angles to the extent of the conveyor belt and this, together with the elevating mechanism for the beam 45 provided by screws 47, and the longitudinal adjustment of the support means 53 along arm 51, renders the present sensing means universally adjustable.

Since the elevational adjustment of the beam 45 provides only a general vertical adjustment of both the tactile and the optical sensing means, further independent vertical adjustable means are provided in conjunction with the support 53 for accurate independent vertical adjustment of the tactile sensing means, the latter being thus universally adjustable to position the same in an accurate manner at the proper location for presenting the same to the desired point on containers of various sizes and shapes.

The support designated generally by the reference numeral 53 comprises a block 56 which is clamped to the arm 51, for adjustable positioning of the support along the arm 51, by clamp means previously identified herein in a general way by the reference numeral 54. As shown in FIG. 7, block 56 has a T-slot formed in its bottom surface and a clamp plate 58 is disposed therein. A second clamp plate 59 is disposed beneath arm 51 and screws 60 thread into clamp plate 58 to clamp the block 56 to arm 51 of the support structure at any desired position along the latter.

The support means 53 for the tactile sensing mechanism further comprises a bracket 64 which is carried by block 56 and is adjustable horizontally therealong in a direction at right angles to the extent of the conveyor belt 15. To this end bracket 64 is provided with facing grooves which receive lateral tongues 65 formed on block 56, whereby the bracket 64 is adapted to slide freely in a horizontal direction with respect to block 56, as will be apparent from a consideration of FIGS. 6 and 7.

An adjusting screw 68 is mounted at its opposite ends for free rotation in bracket 64 but is held against axial movement with respect to bracket 64. The medially threaded portion of screw 68 threads through block 56 as shown in FIG. 7, so that manual rotation of screw 68 produces accurate horizontal adjustment of bracket 64 with respect to block 56. Maintenance of adjusted position is effected by a set screw 70 which threads through a side wall portion of bracket 64 and engages against a tongue 65 of block 56.

At its right-hand end bracket 64 is provided with a bearing formation 71 and a hollow shaft 72 extends through bearing formation 71 and is held against rotation with respect thereto by a key designated 73 (FIG. 6). The shaft 72 comprises a main carrying component of the tactile sensing means and is normally rigid during operation of the inspection apparatus but provided with means for vertical adjustment thereof to properly position the sensing means with respect to a given size, shape and disposition of the article to be inspected, as will presently appear.

Referring particularly to FIGS. 2 and 4, a U-shaped bracket 76 is fixed to a reduced upper end portion of shaft 72 by means of a nut 77 and an inverted U-shaped bracket 78 is attached to the legs of U-shaped bracket 76 to form a generally rectangular frame at the upper end of shaft 72. Screw and slot connections 79 connect the U-shaped brackets 76 and 78 for adjustment of the same to vary the height of the rectangular frame formed thereby.

A height adjustment screw 82 is journaled at its lower end in an extension 83 of the bearing formation 71 of bracket 64 so that screw 82 is free to rotate relative to bearing 83 but is held against relative axial movement. A threaded portion of screw 82 passes through a threaded bearing formation 85 which is formed upon or fixed to U-shaped bracket 76 and, obviously, rotation of screw 82 by means of a manual knob at its upper end (not shown) will raise and lower the bracket structure 76, 78 and the supporting shaft 72 of the tactile sensing mechanism.

As indicated earlier herein, once the sensing mechanism is set up for inspection of a given size and shape of container, the supporting shaft 72 of the tactile sensing mechanism remains stationary and rigid unless necessity for adjustment thereof arises. The actual tactile sensing mechanism itself, including the means for cyclically moving the same to and from an inspection position with respect to containers at the inspection station, is illustrated in detail in FIGS. 5 and 8 through 11 and description of such sensing mechanism and its supporting and moving instrumentalities will now be set forth.

Referring particularly to FIGS. 5 and 10, a bracket 90 has a collar formation 91 detachably fixed to the lower end of shaft 72 and a depending arm portion terminating in bifurcations 93 which provide a fulcrum support for a normally horizontally extending lever member 94. A pair of pivot studs 95 serve to pivotally support lever 94 between the bifurcations 93.

An extension coil spring 96 is attached at its lower end to the right-hand end of lever 94 as viewed in FIG. 5 (the left-hand end thereof as viewed in FIG. 2) and the upper end of spring 96 is attached to an extension 97 of the collar 91 of bracket 90.

Extension coil spring 96 tends to urge lever 94 in a counterclockwise direction as viewed in FIG. 5 (in a clockwise direction as viewed in FIG. 2) that is, toward the active or inspecting position of the tactile sensing means and, incidentally, the position illustrated fragmentarily in dot and dash lines in FIG. 5. The lever 94 and the sensing means carried thereby are illustrated in their full line position of FIG. 5 in the position that these parts assume between inspecting operations when they are raised to clear containers moving into or out of the inspection zone. The means for normally maintaining the lever 94 in the full-line inactive position of FIG. 5 will now be described.

Shaft 72 is hollow and an inner shaft 100 extends slidably therethrough and is provided with an enlargement 101 at its lower end which rests upon lever 94. Referring particularly to FIG. 2, an electromagnet 103 is fixed to the underside of bracket 78 and an armature controlled by the electromagnet has an enlarged lower end portion designated 104 in FIG. 2.

An arm 105 is pivoted to bracket 78 at one end and at its other end rests upon a pin 106 which projects from the enlargement 104 of the armature of electromagnet 103. A compression coil spring 107 is disposed between the upper portion of bracket 78 and arm 105, urging the latter in a clockwise direction as viewed in FIG. 2 and thus urging the enlargement 104 of the armature of electromagnet 103 downwardly against the top end of shaft 100 and the enlargement 101 at the lower end of shaft 100 is in turn urged downwardly against lever 94.

In FIG. 2 electromagnet 103 is shown energized and accordingly the armature thereof is withdrawn upwardly and arm 105 is in its upper position, against the resistance of compression coil spring 107.

It will be noted by reference to FIG. 2 that the forces urging lever 94 in a clockwise direction as there shown comprise the weight of the sensing mechanism carried by the right-hand end of lever 94 and the force of extension coil spring 96, the latter force being adjustable by reason of the screw threaded anchor devices provided at its opposite ends as clearly shown in FIG. 5. The forces tending to urge lever 94 in a counterclockwise direction as viewed in FIG. 2 comprise generally the weight of the armature of the electromagnet 103, the weight of the arm 105, and the urge of compression coil spring 107 and the spring forces are selected and adjusted so that these forces will predominate when the electromagnet 103 is not energized.

When these latter three forces are neutralized by energization of electromagnet 103, extension coil spring 96 and the weight of the mechanism at the right-hand end of lever 94 as shown in FIG. 2 (this being the mechanism shown at the left-hand end of lever 94 in FIG. 5) cause the lever 94 to drop to the full-line position illustrated in FIG. 2 (the dot and dash line position of FIG. 5) which is the actual sensing or inspecting position of the parts carried by lever 94.

When electromagnet 103 is deenergized at the end of an inspection cycle, the urge of compression coil spring 107 against arm 105 and the weight of arm 105 and the armature of the electromagnet 103 act downwardly against the upper end of shaft 100 and, through the enlargement 101 at the lower end of the latter, bear against the lever 94 to rock the same to the idle or withdrawn position illustrated in full lines in FIG. 5.

Reference will now be had to the instrumentalities for actually traversing the desired surfaces of the glass container or similar article to detect surface imperfections therein by tactile sensing. This mechanism is disposed generally at the left-hand portion of lever 94 as shown in FIG. 5 and is also shown in bottom plan in FIG. 9 and in elevation in FIG. 10, the latter being shown as viewed from the left-hand side of FIG. 5.

Newly formed glass, commonly referred to in the art as pristine glass, has a very high coefficient of friction, and accordingly the apparatus of the present invention provides lubricating means to facilitate passing a feeling or sensing member along the surface of the glass, the lubricating means being disposed in advance of the feeling or sensing member to provide a lubricated glass surface for the feeling or sensing member to pass over. This avoids chatter of the sensing member due to frictional seizing and avoids false indications due to these unusual frictional characteristics.

This lubricating arrangement is likewise carried by the left-hand end of lever 94 as viewed in FIG. 5 and is moved to and from the glass surface at the beginning and end of inspection operations along with the sensing means by the aforesaid rocking movement of the lever 94. An arm 110 for supporting the lubricating element is fixed to the outer end, that is the left-hand end as viewed in FIG. 5, of lever 94. Arm 110 is shown in detailed perspective in FIG. 11 and is provided at its outer end with a slot 111 which slidably receives a block 112 which has a wick member 113 at its lower end.

A fluid conduit 115 extends through block 112 into fluid communication with wick 113 and, as shown in FIG. 5, a lubricant conduit 116 leads to the wick conduit 115 to supply lubricant fluid to the wick. A reservoir designated 120 in FIG. 4 is attached to an extension 121 of bearing formation 71, and feeds lubricant to the conduit 116 for ultimate delivery to the wick 113, the latter being positioned to wipe along the surface of the glass container to be inspected in advance of the tactile sensing element itself. The lubricating holder and wick are lightly biased to wiping contact by a wire spring member 123 which is fixed to arm 110 and bears against holder 112 as clearly illustrated in FIG. 5.

The tactile sensing means per se, while generally supported from lever 94 along with the lubricating device just described, is mounted upon a separate pivoted block carried by lever 94 in such manner as to provide a delicately adjustable sensing pressure against the glass surface. The left-hand end of lever 94 as viewed in FIG. 5 is bifurcated and the bifurcations thereof are designated 124 and 125 in FIG. 10.

A pair of short depending arms 126 and 127 are fixed to the outer sides of the bifurcations 124 and 125, respectively, and the pivoted block which carries the tactile sensing device, the same being designated generally by the numeral 129, has a medial generally horizontal plate portion 130 which is pivoted between the arms 126 and 127, the pivots being disposed (as viewed in FIG. 5) directly behind or in line with lubricant cups 133 which are provided on the arms 126 and 127 for lubricating the pivot bearings of the block member 129.

The holder for the element which traverses the glass to indicate surface defects therein comprises, as shown in detailed perspective in FIG. 11, a block 135 which is mounted upon a flexible blade 136 which is attached in turn at its opposite end to pivoted block 129. A generally U-shaped wire feeler 137, which serves generally the same function as the stylus in phonograph record reproduction, has its upper leg portion disposed in lateral vertical grooves formed in a block 138 which is removably held in a recess 139 in holder block 135 by a screw 140. The generally triangular member shown at 141 in FIG. 11 is of resilient material such as rubber and is inserted in the lower bight portion of the feeler 137 to serve merely as a damper for the feeler.

It will be noted that the bottom bight portion of the feeler member 137 extends obliquely to engage the finish portion of a glass container in an effective manner and along a desired peripheral zone as indicated by the dot and dash lines in FIG. 5. Obviously if other portions of articles or round articles of other shapes are to be dealt with, the feeler will assume other forms for convenient and effective access to the desired zone of the article.

A conventional photo pickup crystal cartridge designated by the reference numeral 145 is mounted upon a pair of posts 146 on the plate portion 130 of the pivoted block member 129. Impulses from the feeler member 137 are impressed upon the crystal of the cartridge 145 in the form of a biasing torque through a rod member designated 147 in FIG. 10 which extends from the holder 135 to the cartridge 145. The resilient mounting of holder 135 and feeler 137 which is afforded by the resilient blade 136 permits effective, accurate and reliable transmission of deflection forces from feeler 137 to the electrically torque-sensitive crystal elements of cartridge 145. The crystal cartridge 145 is electrically connected to a junction block 148 on bracket 90 as shown in FIG. 10 and conductors 149 therefrom lead to suitable amplifying means and thence to the electro-magnet 40 of the deflector member 41.

The means for imparting a nicely adjustable resilient bias to the pivoted block 129 which carries the foregoing tactile sensing means is shown at the right-hand end of pivoted block 129 in FIG. 5 and will now be described, in conjunction with FIGS. 9 and 12, particularly the latter. As shown in the bottom plan view, FIG. 9, an arm 150 is fixed to pivoted block 129 and extends to the right therefrom as viewed in FIG. 5.

A block 151 at the outer end of arm 150 carries an abutment screw 152 which has a rubber abutment end member 153 at its upper end. Thus counterclockwise pivotal movement of block 129 as viewed in FIG. 5 is limited by impingement of the rubber abutment member 153 of screw 152 against the underside of lever 94. This limit position is nicely adjusted by screwing screw 152 in or out of the end portion 151 of arm 150 and adjustment is maintained by a lock nut 154.

An extension coil spring 160 is provided at its upper and lower ends with anchoring screws 161 and 162, respectively, which thread into lever 94 and the end block portion 151 of arm 150, respectively. Obviously, the effective force of extension coil spring 160 may be nicely adjusted by screwing the anchoring members 161 and 162 into or out of the lever 94 and the member 151 of arm 150. The spring tension adjustment may be locked by means of a set screw 164.

We claim:

1. Automatic inspection apparatus for glass articles having circular surface portions, said apparatus comprising means for moving a series of articles successively to and from an inspection station, means for rotating an article at said station about the axis of said circular portion, and inspection means movable cyclically toward and away from an article at said station in timed relation with respect to the movement of articles to said station for engagement with articles thereat, said inspection means comprising a lubricant applicator for wiping engagement with said circular surface portion and an adjacent tactile sensing element adapted to traverse the lubricated circular surface portion of the article, a phono-pickup element connected to said sensing element and adapted to produce a varying electrical voltage in response to deflection of said sensing element, and means operable upon movement of an article from said inspection station to deflect the same from a normal discharge path in response to an abnormal variation in the output voltage of said pick-up element.

2. Automatic inspection apparatus for glass articles having circular surface portions, said apparatus comprising means for moving a series of articles successively to and from an inspection station, means for rotating an article at said station about the axis of said circular portion, and inspection means movable cyclically toward and away from an article at said station in timed relation with respect to the movement of articles to said station for engagement with articles thereat, said inspection means comprising means for applying lubricant to said circular surface portion and an adjacent tactile sensing element adapted to traverse the lubricated circular surface portion of the article in tactile engagement therewith, a phonopickup element connected to said sensing element and adapted to produce a varying electrical voltage in response to deflection of said sensing element by irregularities in said circular surface portion, and means operable upon movement of an article from said inspection station to deflect the same from a normal discharge path in response to an abnormal variation in the output voltage of said pick-up element.

3. Automatic inspection apparatus for glass articles having circular surface portions, said apparatus comprising means for moving a series of articles successively to and from an inspection station, means for rotating an article at said station about the axis of said circular portion, inspection mounting means movable cyclically toward and away from an article at said station in timed relation with respect to the movement of articles to said station, a lubricant applicator for wiping engagement with said circular surface portion, means mounting the same resiliently upon said inspection mounting means, and an adjacent tactile sensing element adapted to traverse the lubricated circular surface portion of the article, a phonopickup element connected to said sensing element and adapted to produce a varying electrical voltage in response to deflection of said sensing element, means resiliently mounting said tactile sensing element and said phonopickup element as a unit on said inspection mounting means for independent yieldable movement relative to said lubricant applicator, whereby the applicator and the sensing element are both moved yieldably against the circular surface portion of an article upon cyclic movement of the inspection mounting means toward said article, and means operable upon movement of an article from said inspection station to deflect the same from a normal discharge path in response to an abnormal variation in the output voltage of said pick-up element.

4. Automatic inspection apparatus for glass articles having circular surface portions, said apparatus comprising means for moving a series of articles successively to and from an inspection station, means for rotating an article at said station about the axis of said circular portion, and inspection mounting means movable cyclically toward and away from an article at said station in timed relation with respect to the movement of articles to said station for engagement with articles thereat, a lubricant applicator carried by said inspection mounting means for wiping engagement with said circular surface portion, an adjacent tactile sensing element adapted to traverse the lubricated circular surface portion of the article, a phonopickup element connected to said sensing element and adapted to produce a varying electrical voltage in response to deflection of said sensing element, means resiliently mounting said tactile sensing element and said phonopickup element as a unit upon said inspection mounting means for yieldable engagement against a circular surface portion of an article upon cyclic movement of the inspection mounting means toward said article, and means operable upon movement of an article from said inspection station to deflect the same from a normal discharge path in response to an abnormal variation in the output voltage of said pick-up element.

5. Automatic inspection apparatus for glass articles having circular surface portions, said apparatus comprising means for moving a series of articles successively to and from an inspection station, means for rotating an article at said station about the axis of said circular portion, and inspection means movable cyclically toward and away from an article at said station in timed relation with respect to the movement of articles to said station for engagement with articles thereat, said inspection means comprising a lubricant applicator for wiping engagement with said circular surface portion and an adjacent tactile sensing element adapted to traverse the lubricated circular surface portion of the article, a phono-pickup element connected to said sensing element and adapted to produce a varying electrical voltage in response to deflection of said sensing element, and means operable upon movement of an article from said inspection station to deflect the same from a normal discharge path in response to an abnormal variation in the output voltage of said pickup element, said inspection means being positionally adjustable horizontally and vertically to adjust the sensing element and lubricant applicator for engagement with desired portions of articles of various sizes and shapes.

References Cited in the file of this patent

UNITED STATES PATENTS

| | | |
|---|---|---|
| 1,318,145 | Harbaugh | Oct. 7, 1919 |
| 1,887,021 | Henderson | Nov. 8, 1932 |
| 2,682,802 | Fedorchak | July 6, 1954 |
| 2,759,600 | Saylor | Aug. 21, 1956 |
| 2,778,497 | Bickley | Jan. 22, 1957 |
| 2,896,784 | Greenamyer | July 28, 1959 |
| 2,902,151 | Miles | Sept. 1, 1959 |

FOREIGN PATENTS

| | | |
|---|---|---|
| 521,224 | France | Mar. 3, 1921 |